US005520807A

United States Patent [19]
Myrna et al.

[11] Patent Number: 5,520,807
[45] Date of Patent: May 28, 1996

[54] STACKED FLUID-SEPARATION MEMBRANE DISK MODULE ASSEMBLIES

[75] Inventors: Roman Myrna, Charlotte, N.C.; A. William Schwartz, Upland, Calif.; C. Glen Wensley, Rock Hill, S.C.

[73] Assignee: UOP, Des Plaines, Ill.

[21] Appl. No.: 240,509

[22] Filed: May 11, 1994

[51] Int. Cl.$^6$ ........................................ B01D 63/00
[52] U.S. Cl. ........................ 210/321.75; 210/321.84; 210/232; 210/346; 210/347; 210/350; 210/488; 210/352; 96/7; 96/11
[58] Field of Search ................. 210/321.75, 321.84, 210/350, 346, 347, 352, 456, 433.1, 445, 454, 488, 232; 96/7, 11

[56] References Cited

U.S. PATENT DOCUMENTS

| | | |
|---|---|---|
| 1,913,886 | 6/1933 | Kennedy . |
| 1,987,316 | 1/1935 | Zimmer . |
| 2,304,618 | 12/1942 | Williams . |
| 2,349,469 | 5/1944 | Sloan . |
| 2,359,475 | 10/1944 | Gauthier . |
| 2,582,272 | 1/1952 | Pamp, Jr. ............................ 210/352 |
| 2,592,527 | 4/1952 | Armstrong . |
| 2,592,528 | 4/1952 | Failmezger ........................ 210/347 |
| 2,604,994 | 7/1952 | Vocelka ............................. 210/346 |
| 2,757,803 | 8/1956 | Robinson et al. . |
| 2,902,164 | 9/1959 | Dornauf . |
| 3,083,834 | 4/1963 | Pall . |
| 3,152,988 | 10/1964 | Gutkowski et al. . |
| 3,156,106 | 11/1964 | Crane . |
| 3,259,248 | 7/1966 | Wiegand . |
| 3,390,546 | 7/1968 | Jewell . |
| 3,439,119 | 4/1969 | Gehrmann . |
| 3,528,554 | 9/1970 | Ogden et al. . |
| 3,570,280 | 3/1971 | Aske . |
| 4,132,649 | 1/1979 | Croopnick et al. .................. 210/347 |
| 4,134,642 | 1/1979 | Kapron et al. . |
| 4,203,305 | 5/1980 | Williams . |
| 4,230,646 | 10/1980 | Ghizzoni . |
| 4,243,536 | 1/1981 | Prolss .............................. 210/456 |
| 4,379,051 | 4/1983 | Hiesinger et al. .................. 210/231 |
| 4,601,824 | 7/1986 | Dreyer ............................. 210/232 |
| 4,613,436 | 9/1986 | Wight et al. ....................... 210/232 |
| 4,678,578 | 7/1987 | Nodes et al. ...................... 210/445 |
| 4,698,154 | 10/1987 | Mohn et al. ....................... 210/232 |
| 4,707,258 | 11/1987 | Drori ............................. 210/333.1 |
| 4,759,845 | 7/1988 | Selesnick ......................... 210/450 |
| 4,790,700 | 12/1988 | Schwartzman . |
| 4,801,381 | 1/1989 | Niesen ........................... 210/321.84 |
| 4,855,048 | 8/1989 | Tang et al. ........................ 264/49 |
| 4,945,956 | 8/1990 | Bueyuekgueclue et al. . |
| 5,069,789 | 12/1991 | Mohn et al. ..................... 210/321.84 |
| 5,106,506 | 4/1992 | Schmidt et al. .................. 210/321.84 |
| 5,130,020 | 7/1992 | Meckstroth ....................... 210/650 |
| 5,271,838 | 12/1993 | Rahimi et al. ..................... 210/346 |

Primary Examiner—Ana M. Fortuna
Attorney, Agent, or Firm—Thomas K. McBride; John G. Tolomei

[57] ABSTRACT

A stacked membrane disk module has a number of membrane disks interleaved with seal rings and includes a biasing subassembly for maintaining a compressive force between the membrane disks and interleaved seal rings so that the module can be repeatedly pressurized/depressurized. The membrane disks preferably include a central first aperture and a pair of second apertures which are radially spaced from the central first aperture. These apertures will thus be respectively registered when a number of such membrane disks are stacked between a pair of end plates so as to establish a central fluid passageway and a pair of second fluid passageways. A rigid perforated tube is positioned within the central fluid aperture and is connected to the end plates so that at least one of the end plates is capable of being axially displaced relative to the perforated tube. A biasing member (e.g., a compression spring, stack of truncated conically shaped washers or the like) may thus be concentrically positioned around the perforated tube so as to exert a bias force onto one of the end plates capable of axial displacements and thereby cause a compressive force to be exerted against the membrane disks in the stack.

21 Claims, 4 Drawing Sheets

STACKED FLUID-SEPARATION MEMBRANE DISK MODULE ASSEMBLIES

FIELD OF INVENTION

This invention relates to improvements to membrane modules usefully employed in the field of fluid separations whereby fluid components are separated from a fluid mixture. In preferred forms, the present invention is embodied in a stacked membrane disk module which includes the means by which fluid leakage is prevented by maintaining compressive force on the membrane disks in the stack to accommodate movements of mechanical components during repeated pressurization and depressurization cycles.

BACKGROUND OF THE INVENTION

A variety of commercial processes rely on the use of fluid separation techniques in order to separate one or more desirable fluid components from a mixture. For example, in the production of natural gas, it is typically necessary for the producer to strip carbon dioxide from natural gas in order to meet government regulatory requirements. It is also typically desirable in many chemical processes for hydrogen to be removed and recovered from gaseous process streams.

The use of membranes for fluid separations has achieved increased popularity over other known separation techniques. However, one major disadvantage of membranes for use in fluid separations is that the membranes must be supported in a "package" (sometimes referred to as a "module") which provides the requisite flow path to achieve the desired fluid separation. The membrane package must also exhibit sufficient structural integrity to withstand the pressures needed to effect separation in a given process. These physical demands of membrane packages become especially acute when the membrane package is used in high pressure separation processes (i.e., fluid separation processes having operating pressures of greater than about 500–1000 psi).

Recently, a stacked membrane disk assembly for fluid separations has been proposed in U.S. Pat. No. 4,613,436 issued to William W. Wight et al on Sept. 23, 1986 (hereinafter more simply referenced as "the Wight et al '436 Patent", the entire content of which is expressly incorporated hereinto by reference). According to the Wight et al '436 Patent, a compact stack of alternating layers of membrane disks with layers of feed fluid spacers is suggested. Each such layer is provided with a pair of notches formed in the perimetrical edge and a central aperture. The respective notches and apertures of each layer are registered when stacked such that the registered notches collectively form respective feed and residue channels, while the registered apertures collectively form a permeate channel.

Sealing beads (e.g., bead 40 shown in FIG. 3 and bead 57 shown in FIG. 4 of the Wight et al '436 Patent) extend around the perimetrical edge of the feed fluid spacers from one notch to the other. The sealing beads are thus discontinuous around the edge of the feed fluid spacers in the area of the notches (see, column 9, lines 18–21 of the Wight et al '436 Patent). In use, these discontinuous edge beads cooperate in conjunction with edge seals associated with the distribution plates and feed fluid spacers of the assembly disclosed in the Wight et al '436 Patent (i.e., edge seals 104 and 180 shown in FIGS. 9 and 10, respectively). These edge seals thereby serve as a pressure seal against the interior surface of the pressure vessel in which the assembly is positioned so that the feed and residue channels are collectively defined by the registered notches and a corresponding adjacent interior surface of the pressure vessel wall. In addition, the discontinuous sealing beads employed in the assembly disclosed in the Wight et al '436 Patent serve to fluid-isolate interior regions of the pressure vessel on opposing sides of the stacked membrane disk assembly so as to establish a pressure gradient (e.g., between 1–5 psi) between the feed inlet and residue discharge ports.

While the stacked membrane disk assembly disclosed in the Wight et al '436 Patent represented a significant advance in the art of fluid separations, there exist several practical disadvantages associated with the assembly's required notches and discontinuous sealing beads. As noted above, since the sealing beads are discontinuous, in order to effectively fluid-isolate the feed and residue channels from one another, the beads must make effective sealing contact with the interior surface of the pressure vessel wall. As a consequence, the interior surface of the pressure vessel wall must be machined to very high tolerances to prevent even the slightest gap from existing between the discontinuous sealing beads and the interior surface vessel wall. For example, at high operating pressures of greater than between about 500–1000 psi, a very small gap between the discontinuous sealing beads and the interior surface vessel wall could cause failure of the membrane assembly (i.e., prevent the membrane assembly from performing its intended fluid separation functions).

Improvements to the stacked membrane disk assembly disclosed in the Wight et al '436 Patent are proposed in copending and commonly owned U.S. patent application Ser. No. 08/241,371 filed even date herewith in the name of Roman Myrna et al, the entire content of which is expressly incorporated hereinto by reference. In this regard, a principal improvement disclosed in that copending Patent Application is that the stacked membrane module assembly is self-contained. That is, the membrane module assembly disclosed in that copending Patent Application is itself pressure-isolated and thus does not require edge seals to be formed with the interior surface of the pressure vessel wall. As a result, the only requirement on the internal dimensions of the pressure vessel is that sufficient space be provided to house the membrane assembly. In other words, the longitudinal and/or latitudinal size of the pressure vessel wall can be virtually any dimension since the perimetrical edge of the membrane assembly does not necessarily need to be sealed against the interior pressure vessel wall in order to perform its intended fluid-separation functions.

In use, membrane module assemblies are subjected to repeated pressurization and depressurization cycles due to periodic equipment maintenance and day-to-day processing needs requiring equipment shut-down. When stacked membrane disk modules of the type disclosed in the copending Patent Application cited above are pressurized, some of the structural components may undergo irreversible dimensional deformation. For example, the membrane and/or permeate carrier sheets in the membrane disks may be dimensionally "thinned" when subjected to relatively high pressures (sometimes on the order of greater than 1000 psi) of a given fluid separation process. At the same time, however, the seals employed will typically be sufficiently elastic and/or compressible so that they will maintain a fluid and pressure tight seal with the membrane disks when pressurized.

However, the seals in the module may not be capable of sufficient elastic response to a rapidly decreasing pressure when the module is depressurized to maintain a reliable seal with the membrane disks. As a result, it is likely that the seals will be displaced and/or lose sealing contact with the membrane disk during depressurization which, in turn, causes fluid leakage to occur if the module is depressurized and subsequently attempted to be repressurized. Such fluid leakage will thus cause the module to fail to preform its intended fluid-separation functions. Once fluid leakage has occurred, therefore, the only alternative is to remove the module from service and rebuild the membrane disk and seal components.

It would therefore be especially desirable if means were provided which would allow a stacked membrane disk assembly to undergo repeated pressurization/depressurization cycles without failure (e.g., without experiencing fluid leakage on depressurization). It is towards fulfilling such a need that the present invention is directed.

SUMMARY OF THE INVENTION

Broadly, the present invention is embodied in a stacked membrane disk modules having a number of membrane disks interleaved with sealing layers and which include force biasing structures for maintaining compressive forces between the membrane disks and interleaved sealing layers.

In an especially preferred embodiment of this invention, the membrane disks will each include a central first aperture and a pair of second apertures which are radially spaced from the central first aperture. These apertures will thus be respectively registered when a number of such membrane disks (which might be more than several hundred) are stacked between a pair of end plates so as to establish a central fluid passageway and a pair of second fluid passageways.

A rigid perforated tube is positioned within the central fluid aperture and is connected to the end plates so that at least one of the end plates is capable of being axially displaced relative to the perforated tube. A biasing subassembly which includes a biasing member (e.g., a compression spring, stack of truncated washers or the like) may thus be coupled operatively to the perforated tube so as to exert a resilient force onto one of the end plates.

The biasing subassembly may be positioned exteriorly or interiorly relative to the end plates. In either case, a force adjustment member (e.g., a force adjustment nut, cap or the like) is threadably coupled to the perforated tube so that turning movements thereof will responsively adjust the compressive force applied to the membrane disks in the stack.

In essence, therefore, the biasing subassembly and its associated force adjustment member serve to reduce the effective axial dimension of the rigid perforated tube as measured between the end plates to thereby exert axial tension on the tube between the plates. This exerted axial tension on the perforated tube is translated to that one (or both) of the end plates capable of axial displacements relative to the tube in the form of compressive force applied to the membrane disks in the stack.

Further aspects and advantages of this invention will become more clear after careful consideration is given to the detailed description of the preferred exemplary embodiments thereof which follows.

BRIEF DESCRIPTION OF THE DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 1:
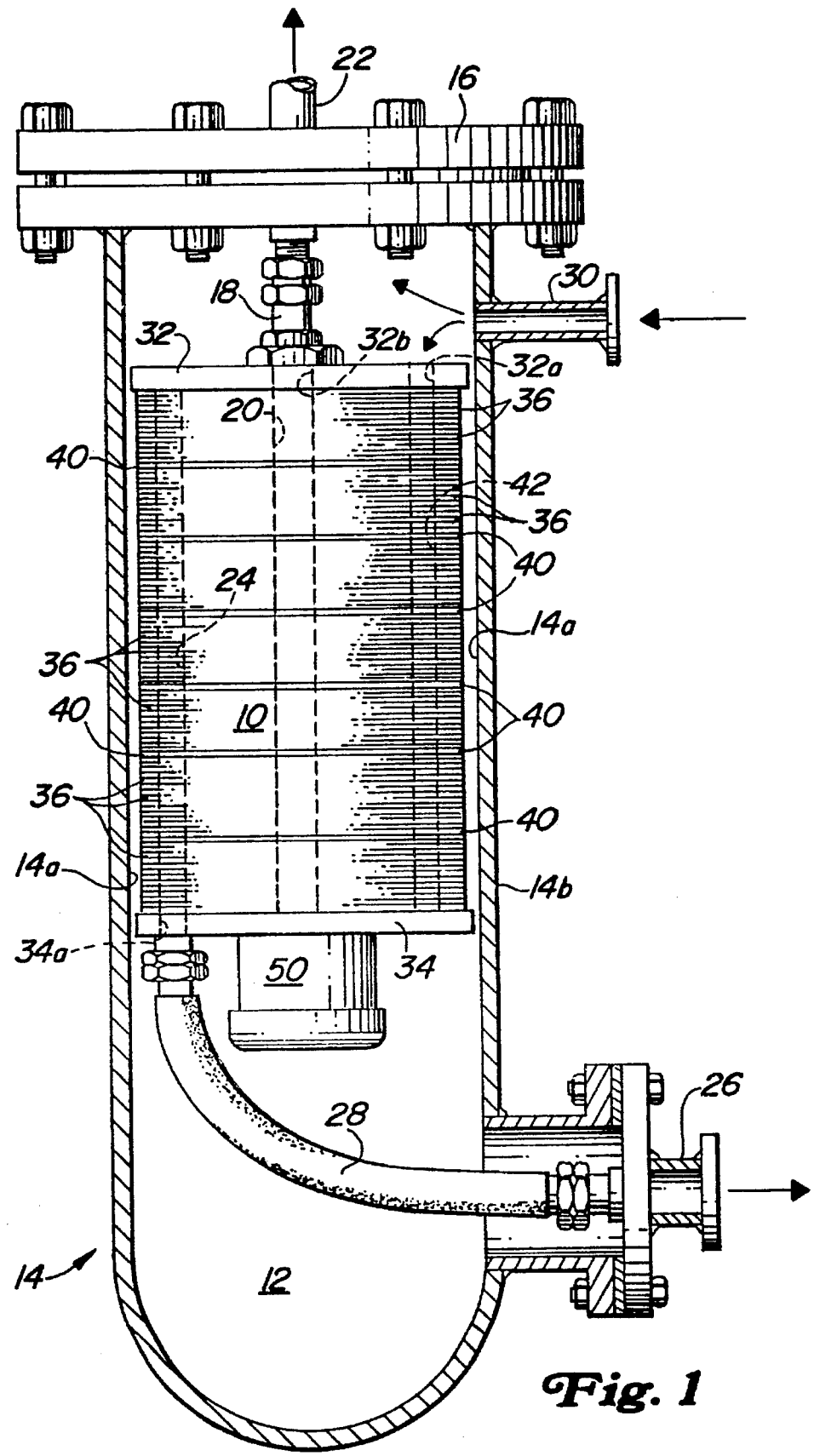
FIG. 1 is a cross-sectional elevational view of a pressure vessel which houses a preferred stacked membrane disk module according to the present invention.

Accompanying FIG. 1 depicts an exemplary stacked membrane module 10 according to this invention positioned within the interior chamber 12 of pressure vessel 14. The module 10 is dependently supported by the upper flange 16 of the pressure vessel 14 via the pipe stem 18 which fluid-connects the permeate passageway 20 defined centrally within the module 10 to a conduit 22 external of the pressure vessel 14 to allow the collected permeate fluid to be transferred to another location.

The residue passageway 24 defined within the module 10 is, in turn, fluid-connected to the discharge port 26 of pressure vessel 14 by conduit 28. Preferably, the conduit 28 is flexible but is of sufficient mechanical strength to withstand the pressure differential which exists between the feed fluid introduced into the pressure vessel via inlet port 30 and the pressure of the residue fluid within the conduit 28. Thus, virtually any flexible conduit may be employed such as reinforced elastomeric conduits, corrugated-type conduits or the like.

The module 10 includes axially spaced-apart end plates 32, 34 (preferably formed of metal) between which a number of membrane disks (some of which are identified in FIG. 1 by reference numeral 36) are positioned in registered stacked arrangement.

The module 10 also defines a feed fluid passageway 42 which communicates with opening 32a in end plate 32. Feed fluid containing at least one fluid component to be separated is thus introduced into the pressure vessel 14 at inlet port 30 and is directed into the feed fluid passageway 42. The end plate 32 also has an opening 32b which allows the central permeate passageway 20 to communicate with the stem 18. The end plate 34, on the other hand, defines a residue opening 34a which allows fluid communication between the residue passageway 24 within the module 10 and the conduit 28.

A biasing subassembly which imparts a compressive force to the stack of membrane disks 36 is contained within sealed housing structure 50 exteriorly of the module 10. In this regard, accompanying FIG. 2 shows one preferred embodiment of a biasing subassembly 52 and associated structures in a larger scale for increased clarity.

Figure 2:
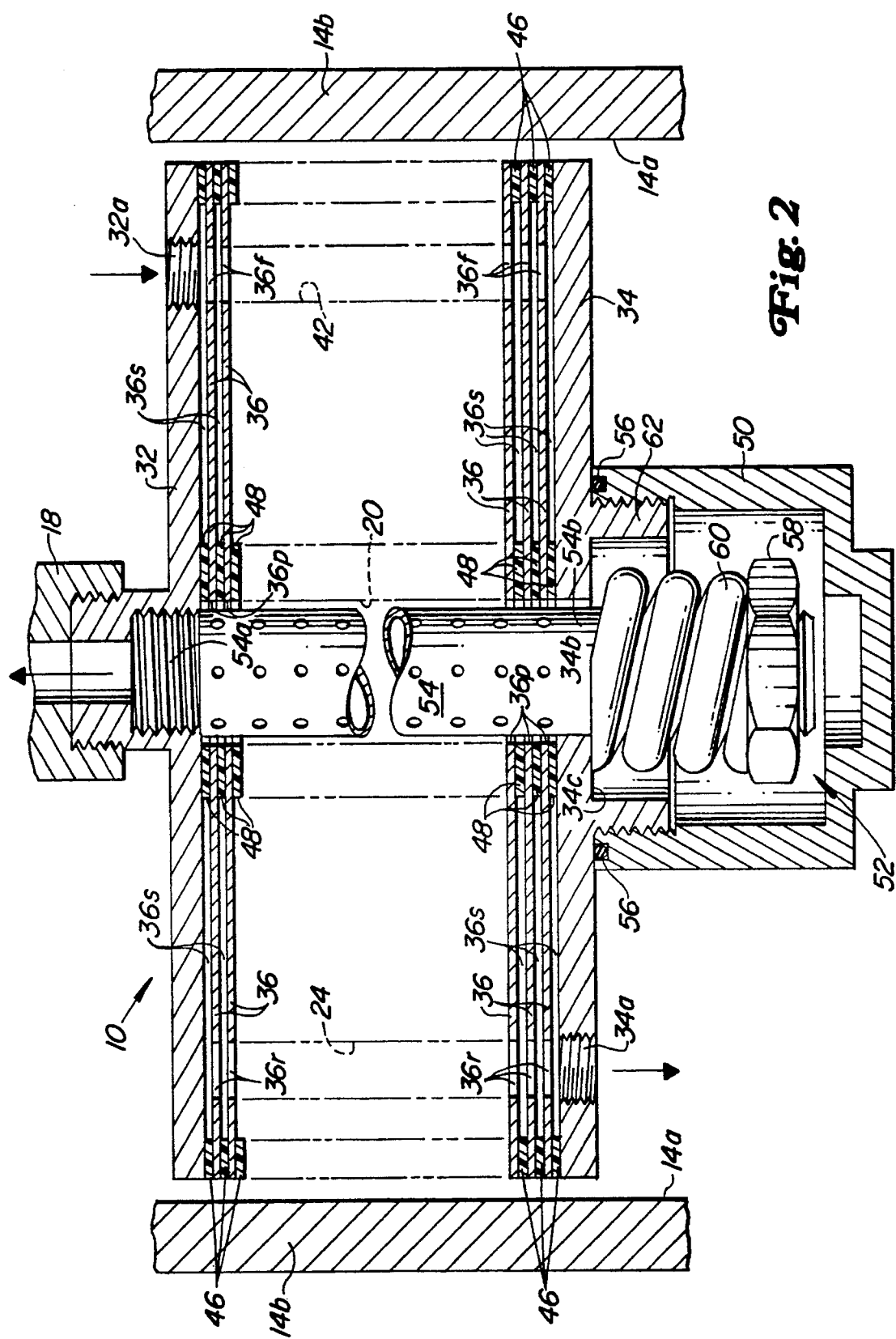
FIG. 2 is a cross-sectional elevational view of one embodiment of an exteriorly positioned biasing subassembly that may be employed in the membrane disk module of the present invention.

As is seen in FIG. 2, the module 10 is generally comprised of a number of membrane disks 36 stacked in registered alignment with one another so their respective permeate, residue and feed apertures $36_P$, $36_R$ and $36_F$ are aligned with one another to establish the permeate, residue and feed fluid passageways 20, 24 and 42, respectively. Interposed between adjacent membrane disks (and between the end plates 32, 34 and the end-most membrane disks 36 in the stack) are low and high pressure seal rings 46, 48. In addition to providing necessary sealing functions, the low and high pressure seals 46, 48 define a slight, but significant, clearance space $36_S$ between immediately adjacent membrane disks 36 in the stack to allow for fluid flow between the feed and residue apertures $36_F$ and $36_R$ across the active membrane faces. Similarly, this clearance space $36_S$ is defined between the end-most membrane disks 36 in the stack and the end plates 32, 34 by virtue of the seal rings 46, 48.

To accomplish this function, the low pressure seal 46 is positioned in annular registered relationship to the perimetrical edge regions of the stacked membrane disks 36 such that the registered feed and residue apertures $36_F$ and $36_R$, respectively, formed in each of the membrane disks 36 are positioned radially inwardly thereof. That is, the low pressure seal 46 is positioned radially outwardly of the apertures $36_F$ and $36_R$ so as to form a continuous seal about the perimetrical edge region of the membrane discs 36. The high pressure seal 48, on the other hand, is positioned concentrically around the central permeate apertures $36_P$ formed in each membrane disk 36.

Thus, the high pressure seal 48 fluid-isolates the central permeate fluid passageway 20 (established by virtue of registered central permeate openings $36_P$) from the feed and residue passageways 42 and 24 (established by virtue of registered feed and residue openings $36_F$ and $36_R$, respectively). The low pressure seal 46, on the other hand, fluid-isolates the feed and residue fluid passageways $36_F$ and $36_R$, respectively, from the pressure condition existing within the chamber 12 of the pressure vessel 14. In other words, the low pressure seals 46 serve to pressure-isolate the interior of the module 10 from the pressure condition existing within the pressure vessel 14.

In the embodiment depicted in accompanying FIG. 2, the biasing subassembly 52 is positioned exteriorly of the module 10 (i.e., outside the end plate 34). The biasing subassembly 52 is generally comprised of a rigid perforated tube 54 which extends coaxially through the registered central apertures of the membrane disks 36 in the stack which establish the permeate fluid passageway 20. The perforated tube 54 has one end 54a rigidly (e.g., threadably) coupled to end plate 32. The other end 54b of the tube 54 passes through a central opening 34b defined in the end plate 34 and extends axially into the housing 50. The end plate 34 and the tube 54 are thus mounted to allow for relative axial displacements therebetween.

The end 54b of the tube 54 within the housing 50 threadably receives a force adjustment nut 58 which, when turned, adjust the bias force exerted by the compression spring 60 acting between the nut 58 and the lower surface 34c of end plate 34. Thus, turning movements applied to the nut 58 will thus cause greater or lesser compressive force to be exerted by the spring 60 and which, in turn, compresses the membrane disks 36 between the end plates 32, 34 to greater or lesser extent, respectively. That is, turning movements applied to the force adjustment nut 58 will responsively cause the effective axial length of the tube 54 between the end plates 32, 34 to decrease or increase (i.e., depending on the turning direction applied to the force adjustment nut 58) which, in turn, causes greater or lesser compression force, respectively, to be applied to the membrane disks 36 in the stack.

The perforated tube 54 will include a number of perforations along its axial length so as to allow the permeate fluid to flow into the interior of the tube 54 and be directed to conduit 18. The number, size and density (i.e., number per unit area) of such perforations are selected in dependence upon several practical criteria such as the type of fluid being processed, pressure and flow conditions of the separations process and the like. For many separation processes in which the module 10 of this invention is employed, however, the size of individual perforations in the tube 54 will be on the order of about ¼" to about ⅜".

Housing 50 is threadably connected to an annular boss 62 rigidly extending from the lower surface 34c of end plate 34 and is sealed against fluid leakage by O-rings 56. Thus, in order to adjust the bias force of the spring 60, the housing 50 is first removed from the boss 62.

Figure 3:
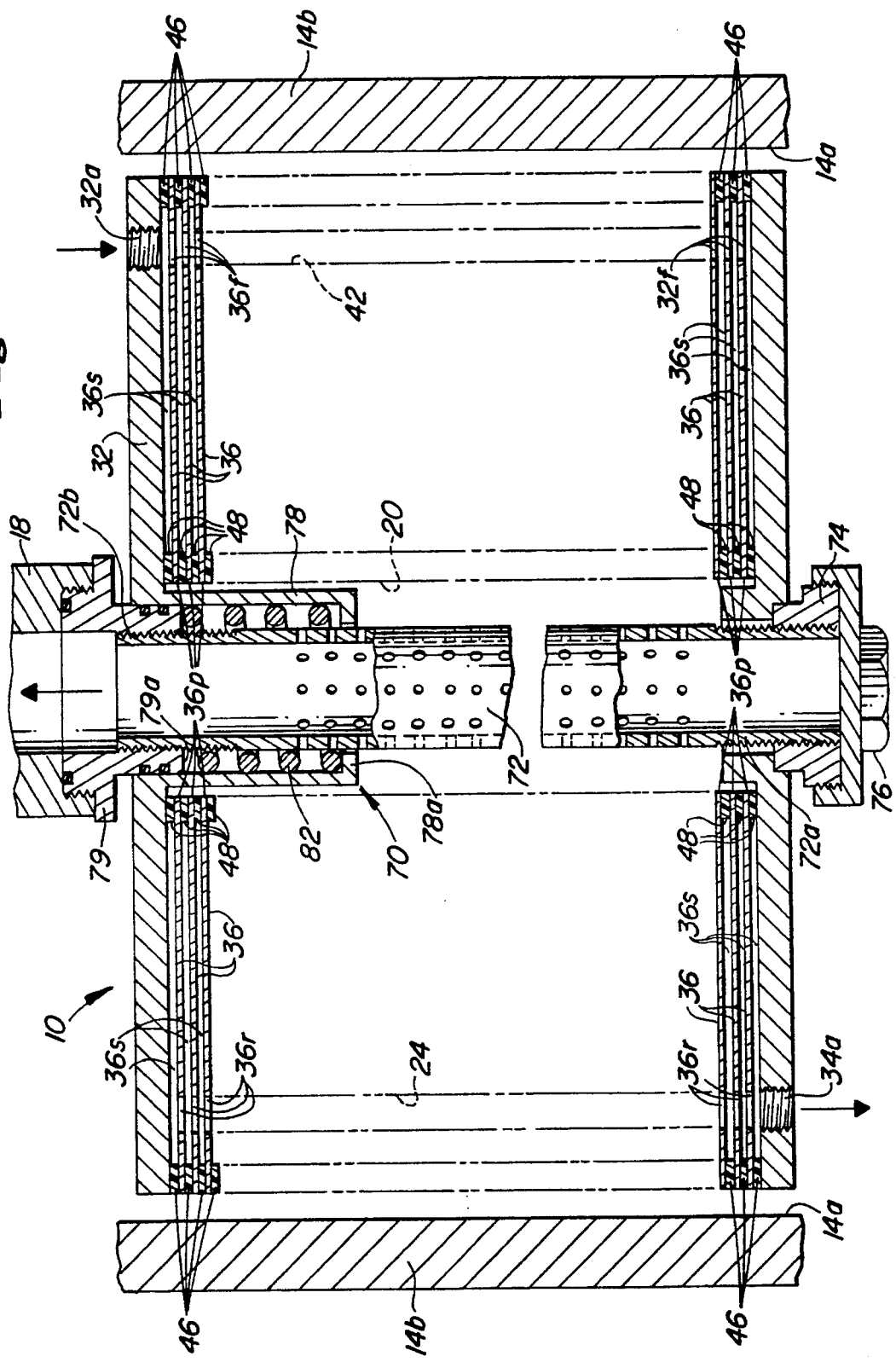
FIG. 3 is a cross-sectional elevational view of another embodiment of a biasing subassembly that may be employed in the membrane disk module of the present invention.

An alternate embodiment of a biasing subassembly 70 which is positioned interiorly of the module 10 is shown in accompanying FIG. 3. As is seen, the biasing subassembly 70, like the embodiment discussed above with respect to FIG. 2, includes a rigid perforated tube 72 which extends coaxially through permeate fluid passageway 20 established by the registered central permeate apertures $36_P$ of the membrane disks 36 in the stack. One end 72a of the tube 72 is rigidly coupled to the end plate 34 (e.g., by being threadably connected thereto). The end plate 34 preferably includes a threaded coupling 74 to allow serial interconnection with the permeate fluid passageway of another membrane module 10. If not serially interconnected with to another membrane module 10, however, the coupling 74 is sealed against fluid leakage by threaded cap plug 76. The opposite end 72b of the tube 72 is threadably coupled to adjustment end cap 79.

The end plate 32 is provided with an integral recessed pocket seat 78 extending toward the interior of the stacked membrane disks 36 within the permeate fluid passageway 20 in coaxially relationship with the tube 72. A compression spring 82 surrounds the tube 72 in the annular space defined between the tube 72 and the pocket seat 78. Thus, the force of the spring 82 acts between the bottom wall 78a of the pocket seat 78 and the lower annular seat 79a of the adjustment cap 79.

Turning the adjustment cap 79 will responsive cause a change in the effective axial length of the tube 72 so as to compress the membrane disks 36 to greater/lesser extent (i.e., in dependence upon the direction of turning movement applied to cap 79) between the end plates 32, 34. For example, assuming right-hand threads are employed, then clockwise turning movements applied to adjustment cap 79 will responsively cause the spring 82 to be axially compressed so that a reliable compressive bias force is exerted to the plate 32 via the seat pocket 78. This compressive force will therefore ensure that the low and high pressure seals 46, 48, respectively, in the module 10 remain in sealed relationship between the membrane disks 36 to prevent fluid leakage and hence module failure.

Figure 4:
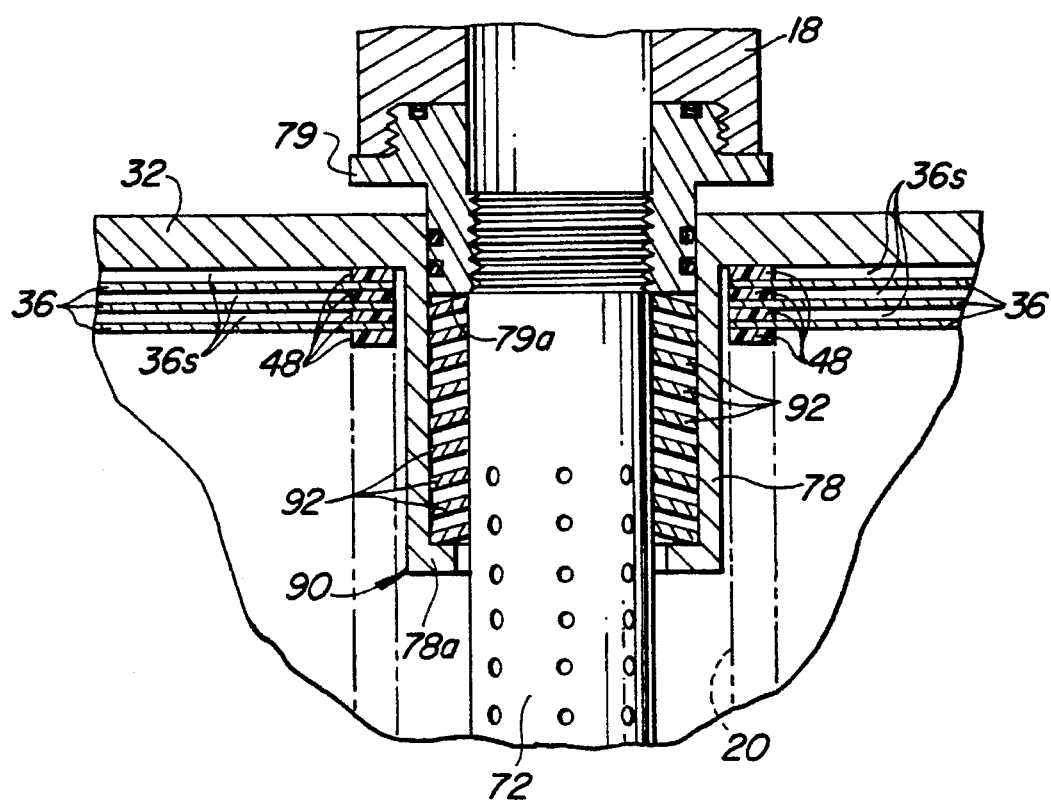
FIG. 4 is a partial cross-sectional elevational view depicting an alternative biasing subassembly that may be employed in the stacked membrane disk modifies of this invention.

Although compression springs have been disclosed in the accompanying drawing FIGS. 2 and 3 as being present in the biasing subassemblies employed in the modules 10 according to this invention, other alternatives may be employed without departing from the present invention. For example, accompanying FIG. 4 depicts a spring subassembly 90 which is identical to spring subassembly 70 discussed above with respect to FIG. 3, except that the compression spring 82 has been replaced with a stack of spring washers 92 having a truncated conical shape (e.g., bellville-type washers). The application of sufficient compressive force to such a stack of washers 92 would therefore cause the end plates 32, 34 to exert a corresponding meaningful resilient compressive force to the stack of membrane disks 36. In a similar manner, the spring 60 shown in FIG. 2 could, if desired, be replaced with a stack of washers 92.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fluid separation module comprising:

a plurality of membrane disks each having a central first aperture and a pair of second apertures radially spaced from said central first aperture, said membrane disks being stacked relative to one another so that said central first apertures thereof are registered to establish a central fluid passageway, and so that said second apertures thereof are registered to establish a respective pair of second fluid passageways;

sealing rings interposed between adjacent membrane disks to fluid-isolate said first fluid passageway from said pair of second fluid passageways and to seal a peripheral edge region of said membrane disks surrounding said pair of second fluid passageways; and a biasing subassembly comprising a biasing member positioned to exert a resilient compressive force onto at least one end of said stack of membrane disks to allow for repeated pressurization and depressurization of said module by maintaining said sealing rings in sealing contact with said adjacent membrane disks.

2. A module as in claim 1, wherein said biasing subassembly includes a pair of end plates between which said stack of membrane disks is positioned, and said biasing member acts on at least one of said end plates to exert said resilient compressive force onto said stack of membrane disks.

3. A module as in claim 2, wherein said biasing member includes a compression spring.

4. A module as in claim 3, wherein said compression spring is positioned on an exterior of one of said end plates.

5. A module as in claim 3, wherein said compression spring is positioned around said central first passageway.

6. A module as in claim 2, wherein said biasing member includes a stack of truncated conically shaped washers.

7. A module as in claim 2, further comprising a perforated tube positioned within said central fluid passageway.

8. A module as in claim 7, wherein said tube includes one end rigidly fixed to one of said end plates and an opposite end which extends through the other of said end plates so as to allow relative axial movement therebetween, and wherein said biasing member surrounds said opposite end of said tube.

9. A module as in claim 8, wherein said biasing subassembly includes a force adjustment member threadably coupled to said opposite end of said tube, and a compression spring positioned between said adjustment nut and said other of said end plates.

10. A module as in claim 9, further comprising a removable housing which encloses said biasing subassembly.

11. A module as in claim 2, wherein one of said end plates includes a recessed pocket seat extending an axial distance within said central fluid passageway, and wherein said biasing member is operatively disposed within said recessed pocket seat.

12. A module as in claim 11, further comprising:

a perforated tube axially positioned within said central fluid passageway and having one end rigidly fixed to one of said end plates and an opposite end which extends coaxially through said recessed pocket seat so that said perforated tube and said recessed pocket seat establish an annular space therebetween.

13. A module as in claim 12, wherein said biasing member surrounds said opposite end of said tube within said established annular space.

14. A module as in claim 12, further comprising a force adjustment member threadably coupled to said opposite end of said tube for adjusting the compressive force on said stack of membrane disks.

15. A fluid separation module comprising:

a pair of end plates;

a plurality of membrane disks each having a central first aperture and a pair of second apertures radially spaced from said central first aperture, said membrane disks being stacked relative to one another between said pair of end plates so that said central first apertures thereof are registered to establish a central fluid passageway, and so that said second apertures thereof are registered to establish a respective pair of second fluid passageways;

seal rings interposed between adjacent membrane disks to fluid-isolate said first fluid passageway from said pair of second fluid passageways and to seal a peripheral edge region of said membrane disks surrounding said pair of second fluid passageways;

a rigid perforated tube having opposed ends, one of said ends rigidly coupled to one of said end plates and another of said ends being coupled to another of said end plates to allow for relative axial displacements therebetween; and biasing means for providing a resilient force acting on at least said another of said end plates to cause a compressive force to be exerted onto said stack of membrane disks against said one of said end plates, whereby repeated pressurization and depressurization of said module may occur by virtue of said biasing means maintaining said sealing layers in sealing contact with said adjacent membrane disks.

16. A module as in claim 15, wherein said biasing means is a spring.

17. A module as in claim 15, wherein said spring is a compression spring.

18. A module as in claim 15, wherein said biasing means is a stack of truncated conical washers.

19. A module as in claim 15, wherein said other of said end plates includes a recessed pocket seat extending into said central fluid passageway and establishes an annular space surrounding an adjacent region of said tube.

20. A module as in claim 18, wherein said biasing means is disposed in said established annular space.

21. A module as in claim 15 or 20, further comprising a force adjustment member threadably connected to said other end of said tube and acting on said biasing means, wherein turning movements applied to said end cap adjusts the compressive force applied to said membrane disks.

* * * * *